United States Patent [19]

Taylor et al.

[11] Patent Number: 4,582,150

[45] Date of Patent: Apr. 15, 1986

[54] AUTOMATED, INTEGRATED, FILLING, CHECK WEIGHING, AND SELF-CORRECTING BAGGING APPARATUS AND METHOD

[75] Inventors: Murland L. Taylor, Parsons, Kans.; J. David Henderson, Tulsa, Okla.

[73] Assignee: Taylor Products Co., Inc., Parsons, Kans.

[21] Appl. No.: 622,797

[22] Filed: Jun. 21, 1984

[51] Int. Cl.4 .................. G01G 19/52; G01G 13/14
[52] U.S. Cl. ................................ 177/50; 177/165
[58] Field of Search ............................ 177/50, 165

[56] References Cited

U.S. PATENT DOCUMENTS

| | | | |
|---|---|---|---|
| 4,366,872 | 1/1983 | Brunnschweiler et al. | 177/165 X |
| 4,393,950 | 7/1983 | Klopfenstein et al. | 177/165 X |
| 4,448,272 | 5/1984 | Keller et al. | 177/50 X |
| 4,524,839 | 6/1985 | Cochran, Jr. et al. | 177/165 X |

*Primary Examiner*—George H. Miller, Jr.
*Attorney, Agent, or Firm*—Head, Johnson & Stevenson

[57] ABSTRACT

A weighing machine for filling containers with a particulate material has a load cell for measuring the amount of material in the container as it is being filled, and differential voltage comparator for determining when the indicated weight of material in the container equals a preset value, or cut-off weight. When the voltage comparator shows the two are equal the flow of material is stopped, but additional material continues to dribble into the container to reach a final weight which may be higher than the desired or target weight. The amount of overweight or underweight of the material in the container is determined, and serves to control a source of voltage which is inserted in series with the cut-off set point voltage. This differential voltage is a function of the amount of overweight or underweight of the contents. This procedure sets in a new set point weight so that the next container will be filled to a lesser weight until the differential weight between the actual weight of material in the container and the target weight are as close to zero as possible.

2 Claims, 1 Drawing Figure

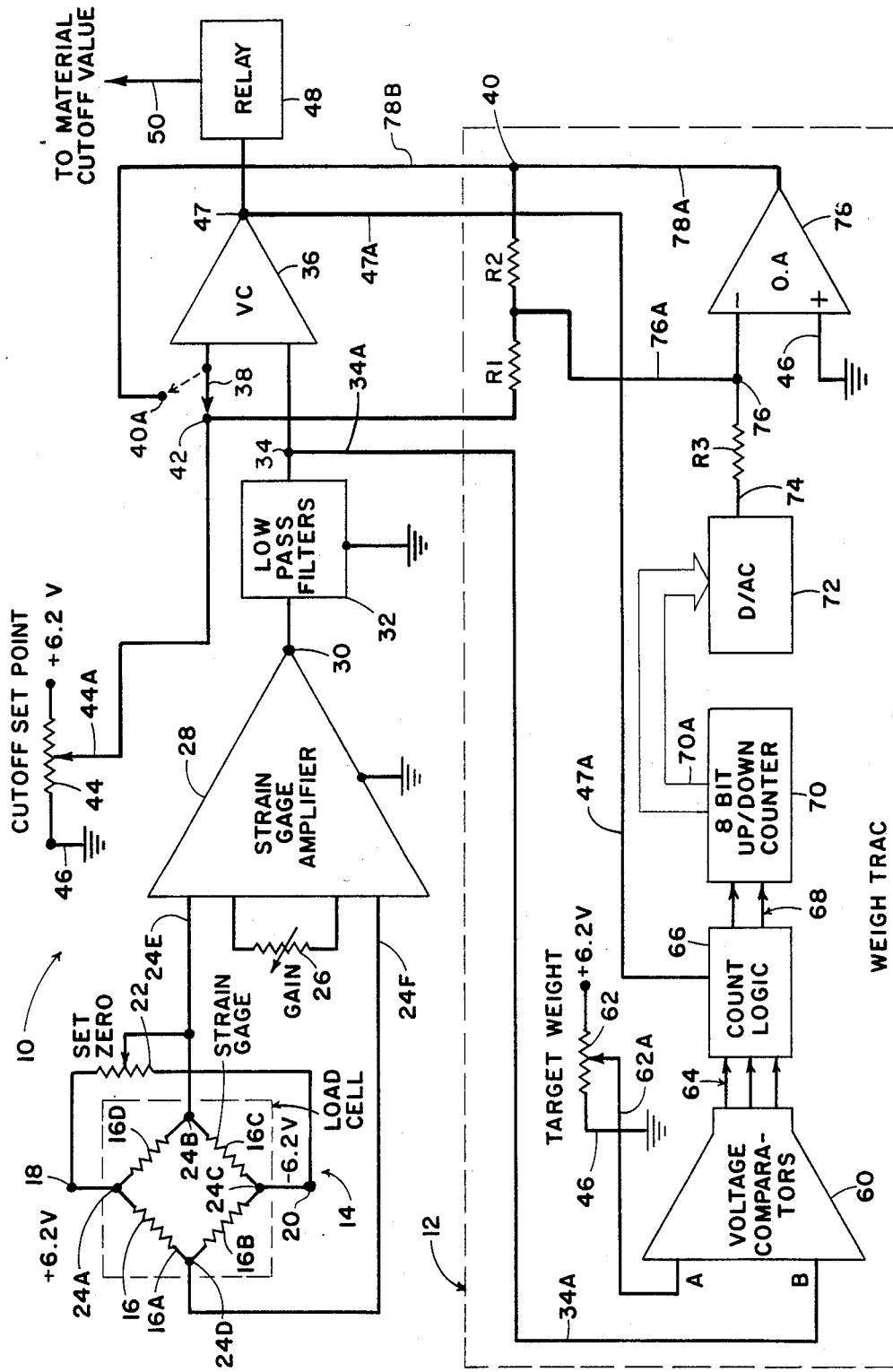

AUTOMATED, INTEGRATED, FILLING, CHECK WEIGHING, AND SELF-CORRECTING BAGGING APPARATUS AND METHOD

BACKGROUND OF THE INVENTION

1. Field of the Invention

This invention lies in the field of weighing and bagging material. More particularly, it concerns a feature which can be added to a conventional weighing machine to continuously monitor the actual weight of the contents of the container, each time a container is filled, adjusting the set point voltage which is the factor which controls the cut-off of flow of material from the hopper, so that by trial and error the amount of material added after the shut off of the principle flow, the resulting weight will be as close as possible to the target weight.

2. Description of the Prior Art

In the prior art it has been possible in the filling of containers to provide a rapid filling means and shut off means and then after the moving material enters the container to make a final total weight of adding to or subtracting from the material in the container to provide an exact weight equal to the target weight. This type of final weighing and adding or subtracting small amounts of material can provide an accurate filling, but makes for a rather slow operation.

In the interest of speeding up the weighing and bagging operation it is sometimes more economical to provide more than the target weight of material in the container than to take the time to remove part of that material in order to reach a closer balance.

It is also possible to have, in a sense, two sources of particulate material that is to be loaded. One would have a large size opening for rapid filling close to the desired target weight, but less than the target weight, and a second smaller flow, and more easily controlled filling means to slowly bring the total weight up to the target weight.

Here again, additional cost of construction and slowness of operation makes it less satisfactory.

Since in all automatic weighing machines there is a comparison being made continuously between the indicated weight of material in the container and a preset, set point weight so that when the two are equal the flow is stopped. In this invention a further simultaneous measurement of the differential weight between the desired target weight and final container weight and depending on how much the overflow or underflow of material there are automatic means for adjusting the set point control voltage up or down as the case may be to compensate for the over or under nominal flow.

SUMMARY OF THE INVENTION

It is a primary object of this invention to provide a self-contained, self-correcting, bagging apparatus that will compensate for variations in particulate material flow after the shut off closure means is closed, so that on the succeeding bag or container the shut off valve will be closed sooner or later as the case may be to correct the final total weight to be as close as possible to the target weight.

While this invention can be used with any of the conventional types of weighing and bagging machines, it will be described as part of a complete system including a basic weighing portion and the self-correcting portion of this invention.

Like most of the conventional weighing and bagging machines a load cell is designed to support the container while it is being filled. The material is a particulate material of selected nature, which is controlled to flow from a hopper through a shut-off valve and through a nozzle into a container. A strain gauge amplifier is utilized to amplify the output of the load cell and the output voltage of the strain gauge amplifier is therefor a measure of the weight of material in the container or bag.

A potentiometer is connected between a known DC voltage and ground so that an adjustable voltage somewhere between zero and the maximum of that voltage source, can be used as a set point voltage, the output of which goes to a voltage comparator, the other input to the comparator being the output of the strain gauge amplifier. Thus, when the weight as measured by the strain gauge output voltage equals the voltage preset in the potentiometer, the voltage comparator will then operate to control a relay and to close off the flow valve.

It is very difficult to suddenly shut off a substantial flow of particulate matter without having a few grains of the matter continue to flow from the outlet of the nozzle into the container. Thus, there is generally more weight of material in the container than would correspond to the set point voltage. The problem then is to provide some automatic means for observing the difference between the actual weight of material in the bag and the value of set point voltage which was set into the machine in order to correct the over flow into the bag, this voltage must be reduced and as conceived by this invention the actual amount of voltage difference between the final weight of the material in the bag and the target weight is converted to a corresponding differential voltage. This differential voltage is used to control a source of voltage which is added to or subtracted from the actual set in, set point voltage. Thus, in effect on the next bag if there had been overflow into the first bag the set point would be automatically reduced an increment of voltage so that the second bag would be stopped a short interval of time sooner, so that the overflow will be less.

The self-correcting means continues to monitor the differential weight of the actual filling material and the target weight and when it goes beyond the target weight and the actual weight is less than the target weight then of course a voltage of opposite sign has to be added in, to delay the shut off valve by a short interval of time to allow a little more of the particulate material to fall into the container. By this means the output flow on succeeding sacks or bags can be fluctuating from plus to minus or from large plus to small plus or vice versa, but in any case, it is continually being monitored and controlled, so that the output weight of a filled container will be as close as possible to the target weight.

BRIEF DESCRIPTION OF THE DRAWING

These and other objects and advantages of this invention and a better understanding of the principles and details of the invention will be evident from the following description taken in conjunction with the appended drawing, which represents schematically the electronic control means for weighing an individual bag empty and then monitoring the weight as it is filled.

The drawing which represents two parts, a first part concerned with the circuitry for a conventional weighing and bagging machine and an additional portion of the circuit. The second part of the circuit and the novel part of the part, which comprises this invention monitor the differential output of the bagging machine, that is, the differential weight between a filled bag and the target weight, and automatically, self-correcting the set point control to maintain the output weight as close as possible to the target weight.

DESCRIPTION OF THE PREFERRED EMBODIMENT

Before explaining in detail the present invention, it is to be understood that the invention is not limited in its application to details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Referring now to the drawing which is a schematic electronic diagram of an apparatus and controls for filling, check weighing, and self-correcting bagging apparatus, the total apparatus is indicated generally by the numeral 10. The numeral 12 represents in a dashed outline, a portion of the FIGURE which described the improved portion of the apparatus which for convenience will be entitled "WEIGH-TRAC".

While a complete description of a weighing and bagging machine should describe the physical apparatus such as the hopper, the material loading conduit, a shut off flow valve, nozzle, a bag and means to support the bag or container and so on. However, since such machinery is old in the art and there are numerous manufacturers who can supply catalog information on all details of the apparatus. In the interest of making this application as short as possible, while making it perfectly clear to a man skilled in the art of weighing and bagging machinery, essentially no description will be made of the prior art apparatus. Another reason for not providing drawings of the conventional bagging machinery, is that each manufacturer has a separate design, and as a matter of fact, each manufacturer may have a large number of different designs devoted to different materials, different sizes and weights of bags and so on. In as much as the invention lies in the electronic control portion of the device, it was deemed unnecessary to go into the details of construction.

The heart of the weighing machine is the load cell indicated generally by the numeral 14 which comprises four resistances 16A, 16B, 16C and 16D connected between four terminals to 24A, 24B, 24C and 24D in the form of a bridge network. A source of d.c. potential is applied between the terminals 24A and 24C, while the intermediate terminals 24B and 24D are the output terminals of the bridge. If the resistances are equal or if they are in equal ratios, the bridge will be balanced, and, while there is voltage across two opposite input terminals, there will be no voltage across the output terminals. If the resistances are not specifically balanced, means are provided, by the set zero potentiometer 22, to adjust for slight unbalance of the resistors. Thus, when there is not weight on the load cell it shows zero voltage output.

The output voltage between terminals 24B and 24D go by means of leads 24E and 24F to a strain gauge amplifier 28 of conventional design, with means shown schematically as 26 for changing the gain of the amplifier. The output of the strain gauge amplifier at point 30, is a measure of the weight of material supported by the load cell and this is all well known in the art. In order to get away from possible alternating signals such as noise picked up in the apparatus or the strain gauge amplifier, a low pass filter 32 which passes substantially only d.c. is used. The output voltage at point 34 would then be a measure of the weight indicated by the load cell.

There is a voltage comparator 36, one input of which is the voltage of 34. The other input to the voltage comparator includes the line 42 to a potentiometer 44 with slider 44A. This potentiometer has a selected d.c. voltage across it to ground 46, and it is possible by sliding the slider 44A to place on the lead 42 and the input to the voltage comparator any desired voltage between zero and the value of V. Since the output of the strain gauge amplifier produces a voltage which is a function of weight, a set point weight cut off potentiometer 44 can be adjusted to provide an opposing voltage such that when the actual weight as represented by the strain gauge voltage, equals the set point voltage, the weight of the contents of the bag is the desired value.

Unfortunately, even though a quick shut off valve is provided, responsive to the output of the voltage comparator 36 through a relay 48 it still takes some time for that flow to be stopped completely and thus there will be over run of material to the container, or bag.

What has been described is the prior art type of weighing and bagging machine, wherein it becomes necessary for an operator to estimate what the setting of the set point weight potentiometer should be in order to have the final weight of material equal to the target value. Thus, if the bag is supposed to have 50 pounds in it, it would be wasted material to have 52 pounds in it, but it would not be desirable either to have 49 pounds. So the operator makes the choice, and probably the result is that the final contents weighs more than the target value.

The improvement of this invention lies in the portion of the circuit which is included within the dashed outline 12. At the input are voltage comparators 60 which have one input on line 34A from the output of the strain gauge amplifier and filter at point 34. This goes to the input B of the voltage comparators. A second input A goes to a similar potentiometer 62 similar to the potentiometer 44 which was used for the set point weight voltage. However, this is called the target weight potentiometer and the setting of the slider 62A is adjusted to a value of voltage which corresponds to the desired weight of the contents of a properly filled bag or target weight. The purpose of this voltage comparator 60 is to continually monitor the output of the bagging machine to compare the output weight at point 34 with a selected target weight which can be set into the machine by the potentiometer 62. The succeeding apparatus, such as the leads 64, the count logic box 66 and the signals going through lines 68 to an eight bit up/down counter 70. Thus, the setting of the counter will be a function of the voltage difference between points A and B of the voltage comparator. This signal which goes to the digital-to-analog converter D/AC 72 via leads 70A is converted into a D.C. voltage on the lead 74. The output lead 74 goes through a resistor R3 to an operational amplifier 78 at point 40, also goes through resistors R2 and line 76A as a feed back to the input of the operational amplifier 78. The junction between R2 and R1 is also connected through resistor R1 to point 42 and to the slider 44A of set point potentiometer 44. One input to the voltage comparator 36 is the signal at point 34. The other input to the voltage comparator 36 is the switch 38. When switch 38 is connected to point 40A the signal from the WEIGH TRAC is being utilized to meet the target weight. With the switch on 42 the system operates without the WEIGH TRAC.

What this does is to take the output of the WEIGH TRAC, which is monitoring the actual weight of the filled bags and comparing it to the target weight and providing an output D.C. voltage which is a function of the magnitude of that difference. This output voltage then is added (at least in part), in series with the voltage from the set point potentiometer and goes to the voltage comparator 36 to the point 40. In other words, the voltage comparator 36 which heretofore has only compared the voltage of the strain gauge amplifier to a potentiometer voltage now sees that potentiometer voltage plus an added increment of voltage acress the two resistors R1 and R2 which are contributed by the automatic control portion and the operational amplifier 78.

The control line 76A from the junction between R1 and R2 goes to the point 76 at the input to the operational amplifier 78. The voltage on lead 76A adds in a portion, that is, the portion across the resistor R1 so that the magnitude of change in set point voltage will be controlled in part by this feed back voltage into the operational amplifier.

The purpose of this is to determine from the differential voltage comparator 60 what the precise difference is in voltage between the set point potentiometer and the output of the strain gauge amplifier, but only a portion of that is used to correct the set point voltage since the purpose is to try and bring those voltages together in a smoother type of operation. In other words, not all of the correction is to be applied on the next bag. Only a portion of the correction is applied, and then it is examined to see whether that next bag is changed in the proper direction. If so, another incremental change is inserted into the set point control and so on until the output differential voltage representing the over or under flow into the bag is as close as possible to the desired value of zero, namely, that the output weight is equal to the target weight.

While the invention has been described with a certain degree of particularity, it is manifest that many changes may be made in the details of construction and the arrangement of components without departing from the spirit and scope of this disclosure. It is understood that the invention is not limited to the exemplified embodiments et forth herein, but is to be limited only by the scope of the attached claim or claims, including the full range of equivalency to which each element thereof is entitled.

What is claimed:

1. In a weighing machine for filling a container to a selected weight of particulate material, the machine having a hopper and means to deliver the particulate material from the hopper through a cut-off valve into the container, the machine having means for determining and subtracting the tare weight of an empty container from an indicated weight to provide a set point weight of material and means to measure a second weight of a container plus contents, minus tare, the improvement in apparatus for continuously monitoring and modifying the set point weight, which is the value of the second weight of the container, plus contents, minus tare at which, during the process of filling said container through said cutoff valve, said cutoff valve is closed, after which a variable amount of said particulate material will continue to dribble into the container to provide a total third weight of contents of said container, comprising:

a strain gauge connected to an amplifier having an output;

a first voltage comparator, one input thereof being connected to the output of said strain gauge amplifier;

a cut-off set point potentiometer providing a selectable cut-off set point voltgage;

a target weight potentiometer providing a selectable target weight voltage;

a second voltage comparator receiving as the inputs thereof the output of said amplifier and said target weight voltage, and having an output;

a voltage divider network, the output of said second voltage comparator being connected to the voltage divider network and said cut-off set point voltage being connected to said network to provide a set-point voltage proportional to said cut-off set point voltage and the volat said second comparator output, the set point voltage being applied to the other input of said first voltage comparator;

means to cut off the flow of material to the container by actuation of the cut-off valve when the output of said strain gauge amplifier equals said set point voltage.

2. The improved apparatus of claim 1 including:

a count logic means having input from said second voltage comparator, and having an output and a control input connected to the output of said first voltage comparator;

an up/down counter having an input connected to said count logic means output and an output providing a digital signal representing the output of said second voltage comparator;

a digital to an alog converter connected to receive the output of said up/down counter and providing an analog voltage signal which is fed to said voltage divider network.

* * * * *